(12) United States Patent
Kobayashi et al.

(10) Patent No.: US 8,035,783 B2
(45) Date of Patent: Oct. 11, 2011

(54) LIQUID CRYSTAL DISPLAY DEVICE AND ELECTRONIC APPARATUS

(75) Inventors: Kazu Kobayashi, Kai (JP); Hitoshi Tsuchiya, Chino (JP)

(73) Assignee: Sony Corporation, Tokyo (JP)

( * ) Notice: Subject to any disclaimer, the term of this patent is extended or adjusted under 35 U.S.C. 154(b) by 234 days.

(21) Appl. No.: 12/399,117

(22) Filed: Mar. 6, 2009

(65) Prior Publication Data

US 2009/0244451 A1    Oct. 1, 2009

(30) Foreign Application Priority Data

Mar. 26, 2008    (JP) .................................. 2008-079956

(51) Int. Cl.
G02F 1/1335    (2006.01)
G02F 1/1343    (2006.01)
(52) U.S. Cl. ....................................... 349/114; 349/139
(58) Field of Classification Search .................. 349/114
See application file for complete search history.

(56) References Cited

U.S. PATENT DOCUMENTS

| | | | |
|---|---|---|---|
| 2007/0263143 A1* | 11/2007 | Igeta et al. | 349/110 |
| 2008/0013022 A1* | 1/2008 | Ochiai et al. | 349/114 |
| 2008/0309853 A1* | 12/2008 | Ge et al. | 349/96 |

FOREIGN PATENT DOCUMENTS

| | | |
|---|---|---|
| JP | 11202356 A | 7/1999 |
| JP | 2005338256 A | 12/2005 |
| JP | 2008170482 A | 7/2008 |

* cited by examiner

*Primary Examiner* — Sarah Hahm
(74) *Attorney, Agent, or Firm* — K&L Gates LLP

(57) ABSTRACT

A liquid crystal display device includes a liquid crystal layer interposed between first and second substrates, a first electrode, and a second electrode having a plurality of linear portions. A reflective display portion and a transmissive display portion are included in one pixel. The thickness of the liquid crystal layer in the reflective display portion is smaller than that of the liquid crystal layer in the transmissive display portion. First and second polarizers having transmission axes approximately perpendicular to each other are provided on outer sides of the first and second substrates. The transmission axis of one of the first and second polarizers is set approximately in parallel to a liquid crystal orientation direction. The plurality of linear portions of the second electrode have predetermined electrode widths and a predetermined electrode distance therebetween.

8 Claims, 11 Drawing Sheets

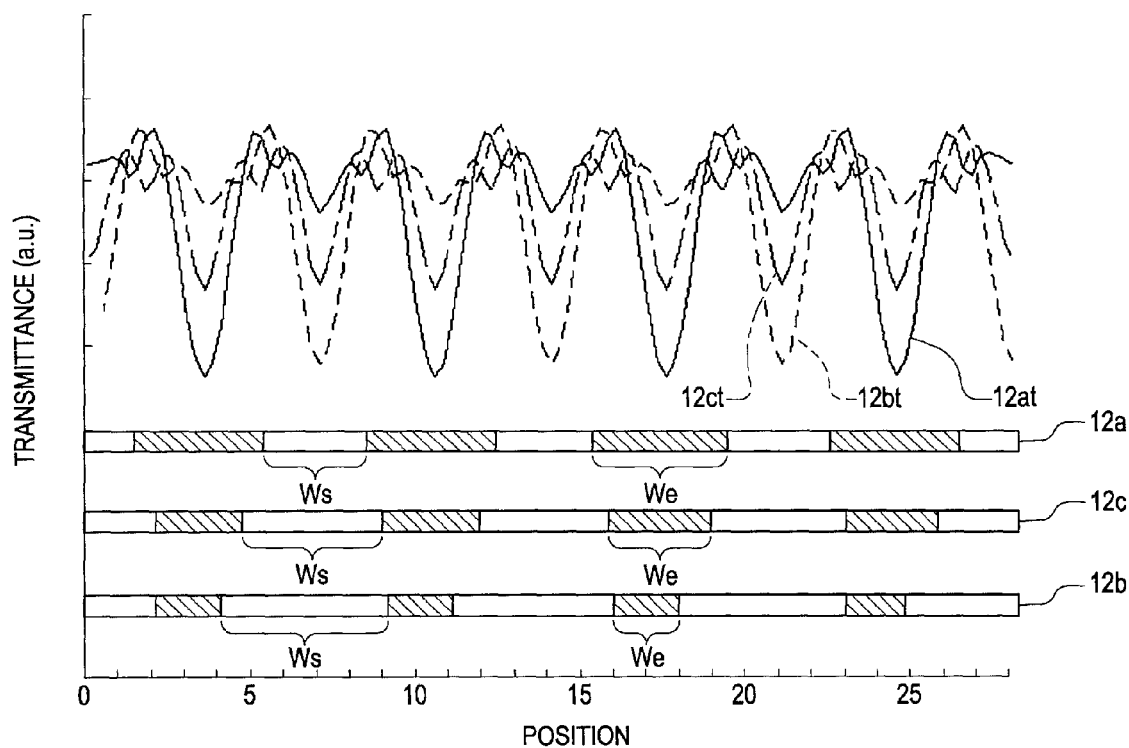

LIQUID CRYSTAL DISPLAY DEVICE AND ELECTRONIC APPARATUS

RELATED APPLICATIONS

The present application is based on, and claims priority from, Japanese Application Number 2008-079956, filed Mar. 26, 2008, the disclosure of which is hereby incorporated by reference herein in its entirety.

BACKGROUND

1. Technical Field

The present invention relates to a liquid crystal display device and an electronic apparatus.

2. Related Art

In current transflective liquid crystal display devices, a homogeneous orientation method and a vertical orientation method are generally used. In such configurations, however, the contrast or viewing angle in a transmissive display portion is decreased since a plurality of retardation films are used.

For this reason, a transflective display method for realizing a wide viewing angle by adopting the FFS (fringe field switching) method, which is known as transmissive display for obtaining a wide viewing angle, for transflective display is proposed (for example, refer to JP-A-2005-338256). In the technique disclosed in JP-A-2005-338256, high-contrast reflective display is realized while maintaining a wide viewing angle, which is the same as in the case of transmissive display, by providing a retardation film in only a reflective display portion.

However, in the multi-gap method (thickness of a liquid crystal layer in a transmissive display portion>thickness of a liquid crystal layer in a reflective display portion) adopted in JP-A-2005-338256, the thickness of the liquid crystal layer in the reflective display portion is small. Accordingly, since liquid crystal molecules are not sufficiently twisted (efficiency is decreased) in the reflective display portion when a voltage is applied, the reflectance in the reflective display portion is low compared with that in the transmissive display portion. This is noticeable particularly on an electrode portion and in a middle portion between electrodes.

SUMMARY

An advantage of some aspects of the invention is to solve at least some of the above problems.

According to an aspect of the invention, a liquid crystal display device includes: a liquid crystal layer interposed between first and second substrates; a first electrode provided on a side of the first substrate facing the liquid crystal layer; and a second electrode having a plurality of linear portions, an electric field being generated between the first and second electrodes. A reflective display portion and a transmissive display portion provided with the first and second electrodes are included in one pixel. The thickness of the liquid crystal layer in the reflective display portion is set smaller than that of the liquid crystal layer in the transmissive display portion. First and second polarizers having transmission axes approximately perpendicular to each other are provided on outer sides of the first and second substrates, respectively. The transmission axis of one of the first and second polarizers is set approximately in parallel to a liquid crystal orientation direction of the liquid crystal layer. The plurality of linear portions of the second electrode are arrayed to have predetermined electrode widths and a predetermined electrode distance therebetween. An electrode distance Wrs of the plurality of linear portions in the reflective display portion is set smaller than an electrode distance Wts of the plurality of linear portions in the transmissive display portion. An electrode width Wre of each of the plurality of linear portions in the reflective display portion is set smaller than an electrode width Wte of each of the plurality of linear portions in the transmissive display portion. The relationship of (Wrs−1.5 μm)≦Wre≦(Wrs−0.5 μm) is satisfied in the reflective display portion and the relationship of (Wts−1.5 μm)≦Wte≦(Wts−0.5 μm) is satisfied in the transmissive display portion.

In this case, by making the electrode width and the electrode distance of the linear portions of the second electrode in the reflective display portion smaller than those in the transmissive display portion and satisfying the relationship in which the electrode width of each of the linear portions of the second electrode is in a range of (electrode distance−1.5 μm) to (electrode distance−0.5 μm) in both the transmissive display portion and the reflective display portion, liquid crystal molecules are sufficiently twisted in both regions of the transmissive display portion and the reflective display portion. As a result, brighter transmissive display and reflective display can be obtained. As a result, the liquid crystal display device capable of obtaining satisfactory display in both reflective display and transmissive display is provided.

In the liquid crystal display device described above, preferably, the relationship of (Wrs−1.0 μm)=Wre and (Wts−1.0 μm)=Wte is further satisfied.

In this case, since the electrode width of each of the linear portion of the second electrode is set to 'electrode distance−1.0 μm', brighter transmissive display and reflective display can be obtained.

In the liquid crystal display device described above, it is preferable to further include: a reflector provided in the reflective display portion on the side of the first substrate facing the liquid crystal layer; and a retardation film that faces the reflector and is provided on a side of the second substrate facing the liquid crystal layer.

In this case, in the reflective display, incident light can be converted into circularly polarized light in a wide band by the retardation film and the liquid crystal layer. Accordingly, since reflective black display with little color variation is obtained, high-contrast reflective display can be realized. Moreover, in the transmissive display, optimal optical design for transmissive display different from the reflective display becomes possible. As a result, transmissive display with high contrast and a wide viewing angle can be realized.

In the liquid crystal display device described above, it is preferable to further include: a reflector provided in the reflective display portion on the side of the first substrate facing the liquid crystal layer; and a retardation film that is provided on a side of the second substrate facing the liquid crystal layer so as to cover the pixel and that has different slow axis directions in the reflective display portion and the transmissive display portion, a slow axis in the transmissive display portion being perpendicular or parallel to the transmission axis of the first polarizer.

In this case, in the reflective display, incident light can be converted into circularly polarized light in a wide band by the retardation film and the liquid crystal layer in the reflective display portion. Accordingly, since reflective black display with little color variation is obtained, high-contrast reflective display can be realized. Moreover, in the transmissive display, the retardation film in the transmissive display portion and the retardation film in the reflective display portion have different optical axis directions. Accordingly, since optimal optical design for transmissive display different from the reflective display becomes possible, transmissive display with high contrast and a wide viewing angle can be realized.

In the liquid crystal display device described above, preferably, retardation of the liquid crystal layer in the reflective display portion is a ¼ wavelength, and retardation of the retardation film is a ½ wavelength.

In this case, since light incident on the reflective display portion can be converted into circularly polarized light in a wider band, reflective display with higher contrast can be realized.

In the liquid crystal display device described above, preferably, the liquid crystal layer has homogeneous orientation, and an angle between a slow axis direction of the retardation film in the reflective display portion and the liquid crystal orientation direction is 65° to 70° or −70° to −65°.

In this case, by making a laminated body of the liquid crystal layer and the retardation film in the arrangement of a wideband ¼ wavelength plate, a reflectance is reduced in the entire visible wavelength region. As a result, colorless reflective display can be obtained with a low reflectance.

In the liquid crystal display device described above, preferably, the liquid crystal layer has homogeneous orientation, and an angle between a slow axis direction of the retardation film in the reflective display portion and the liquid crystal orientation direction is 20° to 25° or −25° to −20°.

In this case, by making a laminated body of the liquid crystal layer and the retardation film in the arrangement of a wideband ¼ wavelength plate, a reflectance is reduced in the entire visible wavelength region. As a result, colorless reflective display can be obtained with a low reflectance.

According to another aspect of the invention, there is provided an electronic apparatus including the liquid crystal display device described above.

In this case, since the above-described liquid crystal display device is mounted, the electronic apparatus having excellent display quality can be provided.

BRIEF DESCRIPTION OF THE DRAWINGS

The invention will be described with reference to the accompanying drawings, wherein like numbers reference like elements.

FIG. 6 is a graph illustrating the relationship between a cell gap difference and a contrast in the liquid crystal display device according to the first embodiment.

DESCRIPTION OF EXEMPLARY EMBODIMENTS

Figure 1:
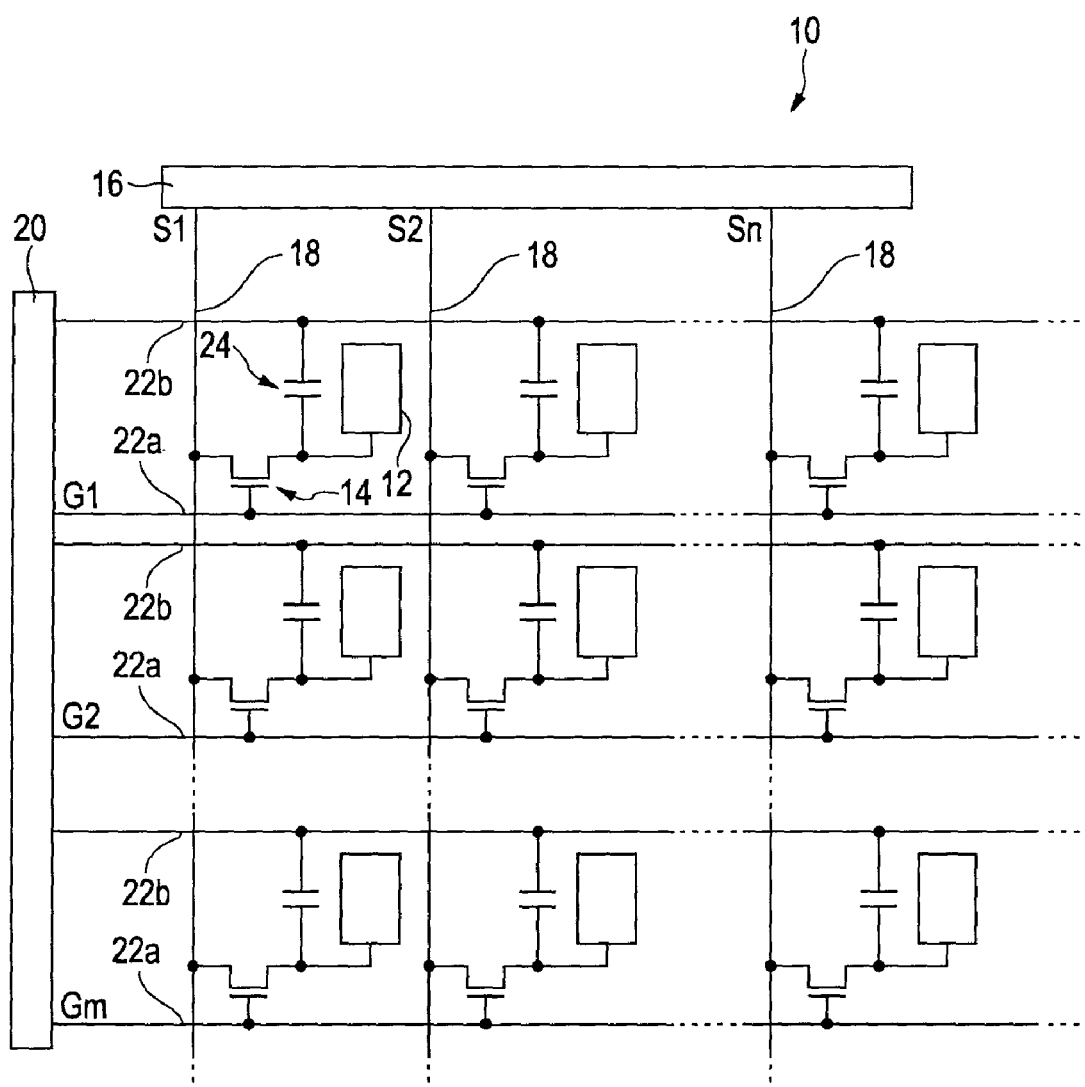
FIG. 1 is a view illustrating the circuit configuration of a plurality of pixel regions arrayed in a matrix to form a liquid crystal display device according to a first embodiment.

Hereinafter, embodiments of a liquid crystal display device will be described with reference to the accompanying drawings. Moreover, in the drawings referred in each of the embodiments, each layer or each member is shown in a different reduced scale in order to have a recognizable size in the drawings.

First Embodiment

FIG. 1 is a view illustrating the circuit configuration of a plurality of pixel regions arrayed in a matrix to form a liquid crystal display device 10 according to the present embodiment.

The liquid crystal display device 10 according to the present embodiment is a liquid crystal display device that adopts an FFS method of performing image display by controlling the orientation of liquid crystal molecules of a liquid crystal layer using a liquid crystal driving field (transverse electric field or oblique electric field method) occurring between different electrodes provided on the same substrate facing a liquid crystal layer. In addition, the liquid crystal display device 10 according to the present embodiment is a color liquid crystal display device including a color filter layer on a substrate. In this case, three pixels that output color light components corresponding to R (red), G (green), and B (blue) as transmitted light components or reflected light components form one color pixel. Accordingly, a display region as a minimum unit for display is called a 'pixel region'.

The liquid crystal display device 10 has an image display region formed by a plurality of pixel regions arrayed in a matrix. In the plurality of pixel regions, pixel electrodes (second electrodes) 12 and TFTs (thin film transistors) 14 (or TFDs (thin film diodes)) for switching control of the pixel electrodes 12 are provided and data lines 18 extending from a data line driving circuit 16 are electrically connected to sources of TFTs 14. The data line driving circuit 16 supplies image signals S1, S2, . . . , Sn to the corresponding pixels through the data lines 18. The image signals S1 to Sn may be supplied in a line-sequential manner in this order or may be supplied to the corresponding plurality of adjacent data lines 18 divided into groups.

In addition, scanning lines 22a extending from a scanning line driving circuit 20 are electrically connected to corresponding gates of the TFTs 14 and scanning signals G1, G2, ..., Gm, which are supplied as pulse signals from the scanning line driving circuit 20 to the scanning lines 22a at predetermined timing, are applied to the gates of the TFTs 14 in a line-sequential manner in this order. The pixel electrodes 12 are electrically connected to drains of the TFTs 14. The image signals S1, S2, ..., Sn supplied from the data lines 18 are written into the corresponding pixel electrodes 12 at predetermined timing by causing the TFTs 14, which are switching elements, to be turned on for only a fixed period by input of the scanning signals G1, G2, ..., Gm.

The image signals S1, S2, ..., Sn with predetermined levels, which are written into liquid crystal through the pixel electrodes 12, are held during a fixed period between the pixel electrodes 12 and a common electrode. Here, in order to prevent the held image signal from leaking, a storage capacitor 24 is provided in parallel with a liquid crystal capacitor provided between the common electrode and each of the pixel electrodes 12. The storage capacitor 24 is provided between the drain of each TFT 14 and a capacitance line 22b. Thus, the TFTs 14 are provided near intersections between the data lines 18 and the scanning lines 22a.

Figure 2:
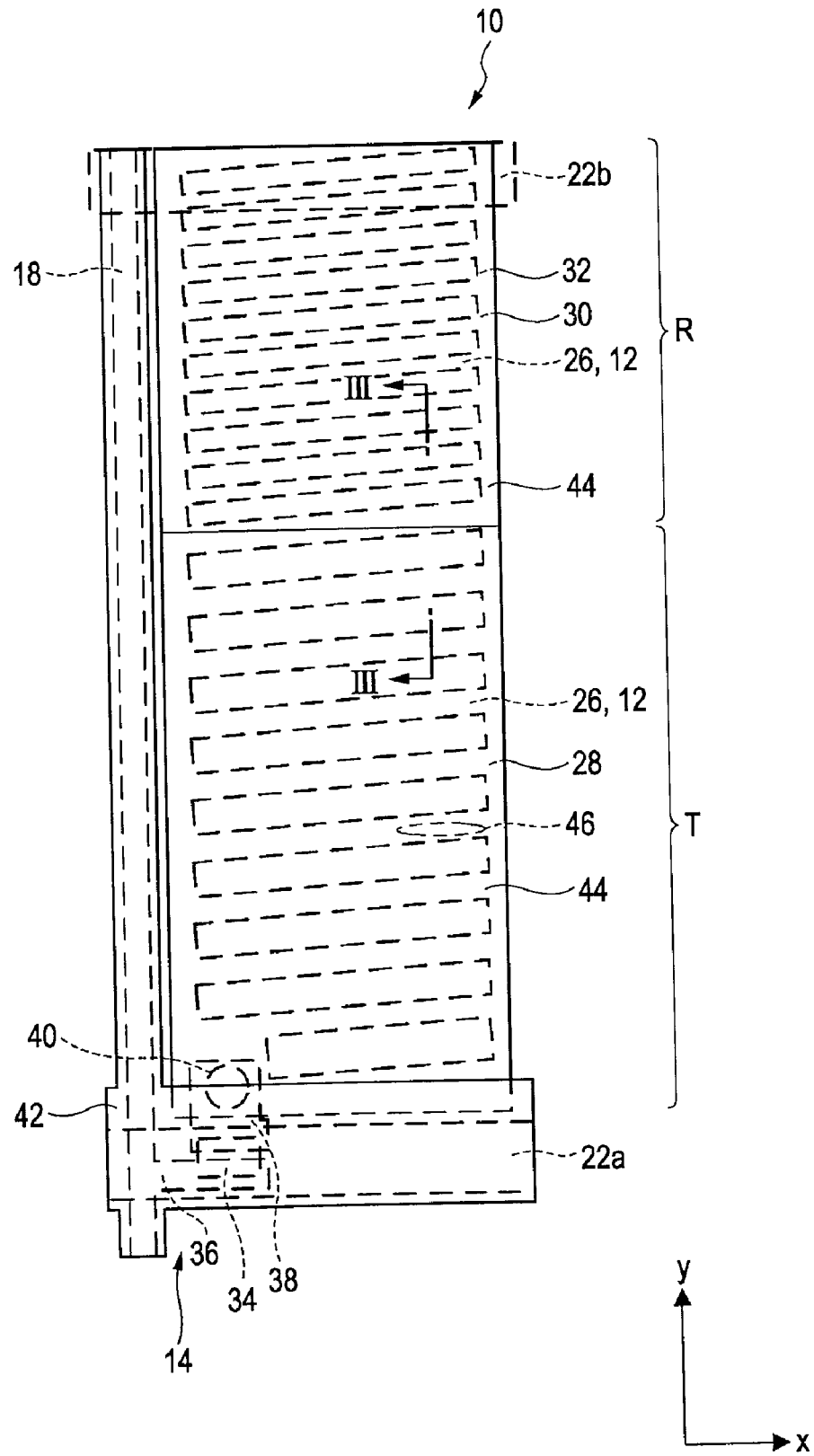
FIG. 2 is a plan view illustrating the configuration in one arbitrary pixel region of the liquid crystal display device according to the first embodiment.
Figure 3:
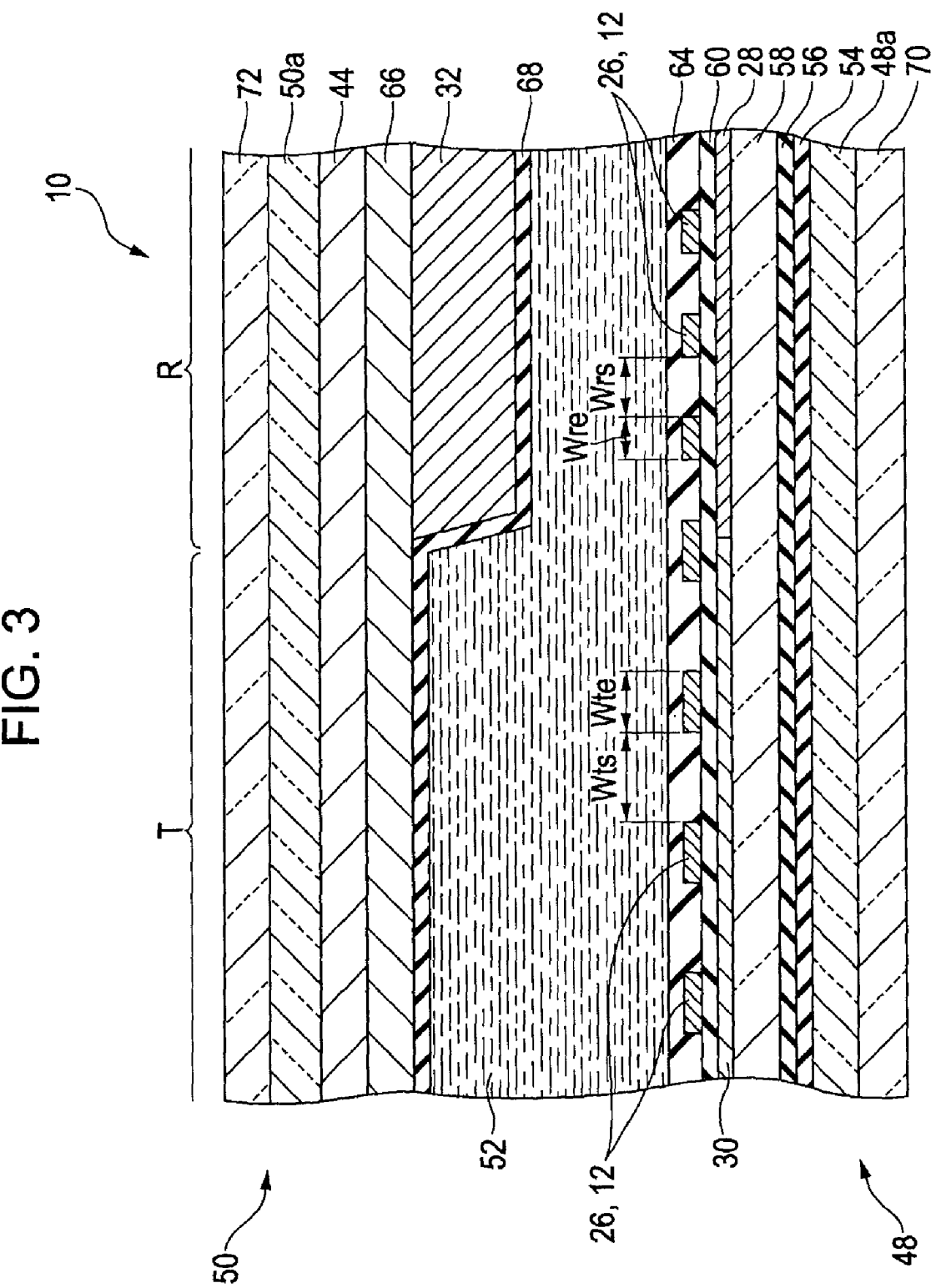
FIG. 3 is a partially sectional view illustrating the configuration taken along the line III-III of FIG. 2.

Next, the detailed configuration of the liquid crystal display device 10 will be described with reference to FIGS. 2 and 3. FIG. 2 is a plan view illustrating the configuration in one arbitrary pixel region of the liquid crystal display device 10 according to the present embodiment. FIG. 3 is a partially sectional view illustrating the configuration taken along the line III-III of FIG. 2.

As shown in FIG. 2, the pixel electrode 12, which has a plurality of linear portions 26 and of which a longitudinal direction is a y-axis direction (extending direction of the data line 18/wiring line for supplying a signal), and first and second common electrodes (first electrodes) 28 and 30, which have solid shapes in plan view and are disposed to overlap the pixel electrodes 12 in plan view, are provided in a pixel region of the liquid crystal display device 10. Moreover, the pixel region shown in the drawing is divided into a reflective display portion R and a transmissive display portion T. In the reflective display portion R, the first common electrode (reflector) 28, which is partially (selectively) provided within the pixel region and has a reflection function, and a retardation film 32 disposed to overlap the first common electrode 28 in plan view are provided. A portion where the first common electrode 28 is provided is the reflective display portion R, and the other portions are the transmissive display portion T. The second common electrode 30, which is partially (selectively) formed within the pixel region and has a transmission function, is provided in the transmissive display portion T. The thickness of a liquid crystal layer 52 in the reflective display portion R is set smaller than that of the liquid crystal layer 52 in the transmissive display portion T.

The first common electrode 28 is formed by a metal layer formed of a light reflecting material, such as aluminum or silver, or by a dielectric-laminated layer (dielectric mirror) obtained by laminating dielectric layers (for example, $SiO_2$ or $TiO_2$) with different refractive indices.

The second common electrode 30 is formed by a conductive layer formed of a light transmissive and electrically conductive material, such as an ITO (indium tin oxide).

The pixel electrode 12 is provided over the transmissive display portion T and the reflective display portion R within one pixel. The pixel electrode 12 is configured to include the plurality of linear portions 26 extending with an angle of 5° in a counterclockwise direction with respect to an x-axis direction (extending direction of the scanning line 22a/wiring line for supplying a signal). The linear portions 26 are arrayed to have predetermined electrode widths Wre (Wte) and a predetermined electrode distance Wrs (Wts) therebetween. The pixel electrode 12 is formed by a conductive layer formed of a light transmissive and electrically conductive material, such as an ITO.

The electrode distance Wrs (spaced distance between short sides/adjacent linear portions 26) between the linear portions 26 provided in the reflective display portion R is set smaller than the electrode distance Wts (spaced distance between short sides/adjacent linear portions 26) between the linear portions 26 provided in the transmissive display portion T. In addition, the electrode width Wre (short side distance) of the linear portion 26 provided in the reflective display portion R is set smaller than the electrode width Wte (short side distance) of the linear portion 26 provided in the transmissive display portion T. In addition, the electrode width Wre of the linear portion 26 satisfies the relationship of (Wrs−1.5 μm) to (Wrs−0.5 μm) in the reflective display portion R and the electrode width Wte of the linear portion 26 satisfies the relationship of (Wts−1.5 μm) to (Wts−0.5 μm) in the transmissive display portion T. Preferably, the electrode distance Wrs between the linear portions 26 provided in the reflective display portion R is set smaller than the electrode distance Wts between the linear portions 26 provided in the transmissive display portion T. In addition, the electrode width Wre of the linear portion 26 provided in the reflective display portion R is set smaller than the electrode width Wte of the linear portion 26 provided in the transmissive display portion T. In addition, the electrode width Wre of the linear portion 26 satisfies the relationship of (Wrs−1.0 μm) in the reflective display portion R and the electrode width Wte of the linear portion 26 satisfies the relationship of (Wts−1.0 μm) in the transmissive display portion T.

The data line 18 extending in the y-axis direction, the scanning line 22a extending in the x-axis direction, and the capacitance line 22b extending in parallel with the scanning line 22a in a state of being adjacent to the scanning line 22a are provided in the pixel region. The TFT 14 is provided near the intersection between the data line 18 and the scanning line 22a. The TFT 14 includes a semiconductor layer 34 which is partially provided within a planar region of the scanning line 22a and is formed of amorphous silicon, a source electrode 36 provided to partially overlap the semiconductor layer 34 in plan view, and a drain electrode 38. The scanning line 22a functions as a gate electrode of the TFT 14 at the position overlapping the semiconductor layer 34 in plan view. The pixel electrode 12 and the TFT 14 are connected to each other through a contact hole 40. A black matrix layer 42 is provided to cover the TFT 14, the data line 18, and the scanning line 22a. A color filter layer 44 is disposed for every pixel region so as to be adjacent to the edge of the black matrix layer 42.

The liquid crystal display device 10 has a configuration in which the liquid crystal layer 52 is interposed between an array substrate (first substrate) 48 and a counter substrate (second substrate) 50 disposed opposite each other, as shown in FIG. 3. The liquid crystal layer 52 is a region between the array substrate 48 and the counter substrate 50 and is sealed between both the substrates 48 and 50 by sealant (not shown) provided along the edges of both the substrates 48 and 50. A liquid crystal molecule 46 (refer to FIG. 2) of the liquid crystal layer 52 is a liquid crystal composition having positive dielectric anisotropy in which a dielectric constant in the oriented direction is larger than that in the normal direction. The liquid crystal molecule 46 is subjected to anti-parallel rubbing processing in parallel and anti-parallel to the x axis such that the liquid crystal orientation is homogeneous orientation. A backlight (illumination device; not shown) is provided on a side (bottom surface side/lower surface side shown in the drawing) of the array substrate 48 not facing the liquid crystal layer 52.

The array substrate 48 has, as a base, a substrate body 48a formed of glass, quartz, or plastic, for example. The scanning line 22a and the capacitance line 22b (refer to FIG. 2) are provided on a side of the substrate body 48a facing the liquid crystal layer 52, and a gate insulating layer 54 is provided to cover the scanning line 22a and the capacitance line 22b.

The semiconductor layer 34 (refer to FIG. 2) is provided on a side of the gate insulating layer 54 facing the liquid crystal layer 52, and the source electrode 36 (refer to FIG. 2) and the drain electrode 38 (refer to FIG. 2) are provided such that parts of the source and drain electrodes 36 and 38 are placed on the semiconductor layer 34. The semiconductor layer 34 is disposed opposite the scanning line 22a with the gate insulating layer 54 interposed therebetween. In the opposite region, the scanning line 22a forms the gate electrode of the TFT 14 (refer to FIG. 2).

A first interlayer insulating layer 56 formed of, for example, a silicon oxide to cover the semiconductor layer 34, the source electrode 36, and the drain electrode 38 are provided. On a side of the first interlayer insulating layer 56 facing the liquid crystal layer 52, a planarizing layer 58 formed of, for example, an acrylic is provided.

The first common electrode 28 is provided in the reflective display portion R of the planarizing layer 58 facing the liquid crystal layer 52. The first common electrode 28 is provided in the reflective display portion R for every pixel region, on a side of the array substrate 48 facing the liquid crystal layer 52.

The second common electrode 30 is provided in the transmissive display portion T of the planarizing layer 58 facing the liquid crystal layer 52. The second common electrode 30 is provided in the transmissive display portion T for every pixel region, on the side of the array substrate 48 facing the liquid crystal layer 52.

As shown in FIG. 2, the first common electrode 28 is provided in a planar region positioned on a side of the pixel region opposite the TFT 14, and the reflective display portion R is formed in the same planar region (overlapping region in plan view) corresponding to the region where the first common electrode 28 is formed. Thus, the first common electrode 28 is disposed adjacent to the TFT 14 within the pixel region in plan view when a long side of the pixel region is divided into two parts and is disposed at the end on a short side of the pixel region where the TFT 14 is disposed. Accordingly, a planar region of the pixel region overlapping the first common electrode 28 is the reflective display portion R of the pixel region and the remaining region is the transmissive display portion T. In addition, it is preferable to use the first common electrode 28 that has a light scattering property by forming an uneven shape on the surface. By adopting such a configuration, the visibility in the reflective display can be improved.

Returning to FIG. 3, a second interlayer insulating layer 60 that covers the common electrodes 28 and 30 and is formed of a silicon oxide, for example, is provided.

The pixel electrode 12 is provided on the second interlayer insulating layer 60 facing the liquid crystal layer 52. The linear portions 26 of the pixel electrode 12 are arrayed to have predetermined electrode widths and a predetermined electrode distance. The electrode distance Wrs and the electrode width Wre in the reflective display portion R and the electrode distance Wts and the electrode width Wte in the transmissive display portion T satisfy the relationships of Wrs<Wts, Wre<Wte, (Wrs−1.5 μm)≦Wre≦(Wrs−0.5 μm), and (Wts−1.5 μm)≦Wte≦(Wts−0.5 μm). Preferably, the relationships of Wrs<Wts, Wre<Wte, (Wrs−1.0 μm)=Wre, and (Wts−1.0 μm)=Wte is satisfied. Specifically, in the liquid crystal display device 10 according to the present embodiment, the electrode width Wte of the pixel electrode 12 is 3.5 μm and the electrode distance Wts is 4.5 μm in the transmissive display portion T, and the electrode width Wre of the pixel electrode 12 is 2.5 μm and the electrode distance Wrs is 3.5 μm in the reflective display portion R. The pixel electrodes 12 are provided on the array substrate 48 facing the liquid crystal layer 52 and are disposed to overlap the common electrodes 28 and 30 in plan view. That is, the pixel electrodes 12 are provided in regions overlapping the common electrodes 28 and 30 in plan view and are also disposed on the common electrodes 28 and 30 with an insulating layer interposed therebetween. The electrode structure is formed only in the array substrate 48. In addition, when a voltage is applied between the common electrodes 28 and 30 and the pixel electrodes 12 configured as described above, a liquid crystal driving field in a direction of a plane (approximately parallel to the surface of the array substrate 48) having an angle of 5° in a counterclockwise direction with respect to the y-axis direction is formed between the common electrodes 28 and 30 and the pixel electrodes 12 mainly through the linear portions 26 of the pixel electrodes 12. The electrode structure is provided only in the array substrate 48.

A horizontal alignment film 64 formed of a polyimide, a silicon oxide, or the like is provided to cover the pixel electrodes 12 and the second interlayer insulating layer 60. The horizontal alignment film 64 is provided adjacent to the liquid crystal layer 52. The horizontal alignment film 64 is formed by sputtering, for example.

On the other hand, the counter substrate 50 has, as a base, a substrate body 50a formed of glass, quartz, or plastic, for example. The color filter layer 44 is provided on the substrate body 50a facing the liquid crystal layer 52. The color filter layer 44 has a plurality of kinds of colored layers with different colors. The black matrix layer 42 (refer to FIG. 2) formed of a black resin, for example, is disposed among the color filter layers 44 with the different colors.

The color filter layer 44 is configured to include, as a main component, a color material layer corresponding to a display color of each pixel. However, the color filter layer 44 may be divided into two or more regions with different chromaticity values within the pixel region. For example, it is possible to adopt a configuration in which a first color material region provided corresponding to a planar region of the transmissive display portion T and a second color material region provided corresponding to a planar region of the reflective display portion R are separately provided. In this case, by making the chromaticity of the first color material region larger than that of the second color material region, it can be prevented that the chromaticity of display light in the transmissive display portion T where the display light is transmitted through the color filter layer 44 only once is different from that in the reflective display portion R where the display light is transmitted through the color filter layer 44 twice. As a result, the uniform visual quality can be obtained in transmissive display and reflective display.

A planarizing layer 66 is provided on the color filter layer 44 facing the liquid crystal layer 52. The planarizing layer 66 is provided on a side of the counter substrate 50 facing the liquid crystal layer 52 in order to eliminate a step difference between the color filter layer 44 and the black matrix layer 42. Since this makes the thickness of the liquid crystal layer 52 uniform, a drop in the contrast due to an uneven driving voltage within the pixel region can be prevented. The planarizing layer 66 also functions as a base layer of the retardation film 32.

The retardation film 32 is provided in the reflective display portion R of the planarizing layer 66 facing the liquid crystal layer 52. The retardation film 32 is provided in the reflective display portion R of the counter substrate 50 facing the liquid crystal layer 52 so as to be opposite to the first common electrode 28. In the present embodiment, the retardation film 32 is a so-called inner retardation film that is provided on the side of the substrate body 50a facing the liquid crystal layer 52 in order to give a phase difference of about ½ wavelength (λ/2) to light having an oscillating direction parallel to the optical axis direction (slow axis direction). The retardation film 32 may be formed by applying a solution of polymer liquid crystal molecules or a solution of liquid crystalline monomers on an alignment film and making the polymer liquid crystal molecules or the liquid crystalline monomers oriented in a predetermined direction when drying and solidifying the solution. For example, the retardation film 32 is formed by making liquid crystal molecules having an optical functional group oriented in a predetermined direction and then optically solidifying the liquid crystal molecules. Here, the phase difference is 280 nm, and the slow axis forms an angle of 67.5° with respect to the x-axis direction.

In the liquid crystal display device 10 according to the present embodiment, a region, in which a planar region including the pixel electrode 12 and a planar region provided with the second common electrode 30 overlap each other in plan view, of the one pixel region shown in FIG. 2 is the transmissive display portion T where display is performed by modulating light that is incident from a backlight and is then transmitted through the liquid crystal layer 52. In addition, a region in which a planar region including the pixel electrode 12 and a planar region provided with the first common electrode 28 overlap each other in plan view is the reflective display portion R where display is performed by reflecting and modulating light that is incident from an outer side of the counter substrate 50 and is then transmitted through the liquid crystal layer 52. The retardation film 32 for making the thickness of the liquid crystal layer 52 in the reflective display portion R smaller than the thickness of the liquid crystal layer 52 in the transmissive display portion T is selectively provided in the region corresponding to the reflective display portion R. In a transflective liquid crystal display device, incident light on the reflective display portion R is transmitted through the liquid crystal layer 52 twice but incident light on the transmissive display portion T is transmitted through the liquid crystal layer 52 only once. Accordingly, since retardation of the liquid crystal layer 52 changes between the reflective display portion R and the transmissive display portion T, a difference in the optical transmittance occurs and uniform image display is not obtained. For this reason, by providing, in the reflective display portion R, the first common electrode 28 partially (selectively) provided within the pixel region and the retardation film 32 disposed to overlap the first common electrode 28 in plan view, a liquid crystal display device having a so-called multi-gap structure in which the thickness (cell gap) of the liquid crystal layer 52 changes between the reflective display portion R and the transmissive display portion T is realized.

Specifically, in the liquid crystal display device 10 according to the present embodiment, a cell gap in the transmissive display portion T is set to 3.4 μm (Δnd=0.34) and a cell gap in the reflective display portion R is set to 1.4 μm (Δnd=0.14; thickness of the retardation film 32 is 2.0 μm) by providing the retardation film 32 in the reflective display portion R. In other words, the thickness of the liquid crystal layer 52 in the reflective display portion R is set to about a half of that of the liquid crystal layer 52 in the transmissive display portion T, such that the retardation of the liquid crystal layer 52 in the reflective display portion R is set to be approximately equal to that of the liquid crystal layer 52 in the transmissive display portion T. As a result, uniform image display can be obtained in the reflective display portion R and the transmissive display portion T.

A horizontal alignment film (second contact layer) 68 formed of a polyimide, a silicon oxide, or the like is provided to cover the planarizing layer 66 and the retardation film 32. The horizontal alignment film 68 is provided adjacent to the liquid crystal layer 52. The horizontal alignment film 68 is formed by sputtering, for example. The horizontal alignment films 64 and 68 are subjected to anti-parallel rubbing processing in parallel and anti-parallel to the x axis such that the liquid crystal orientation is homogeneous orientation.

First and second polarizers 70 and 72 are provided on outer surfaces of the substrate bodies 48a and 50a, respectively. A transmission axis of the first polarizer 70 and a transmission axis of the second polarizer 72 are perpendicular to each other.

Figure 4A:
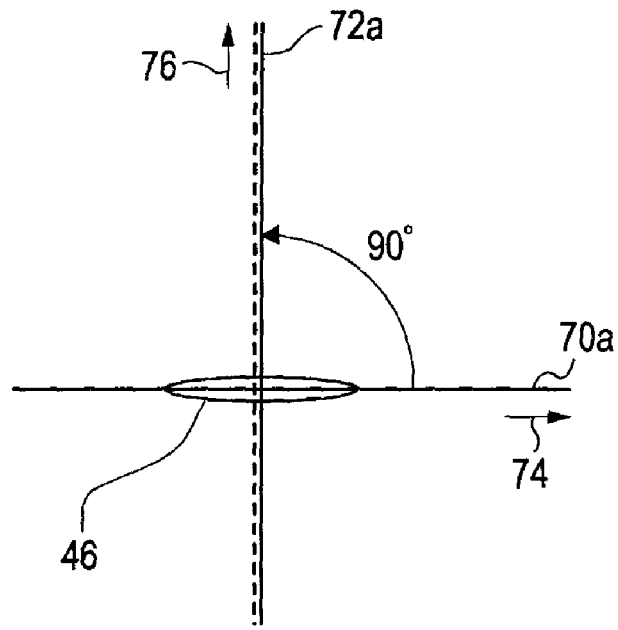
FIGS. 4A and 4B are views illustrating the arrangement of optical axes of the liquid crystal display device according to the first embodiment.
Figure 4B:
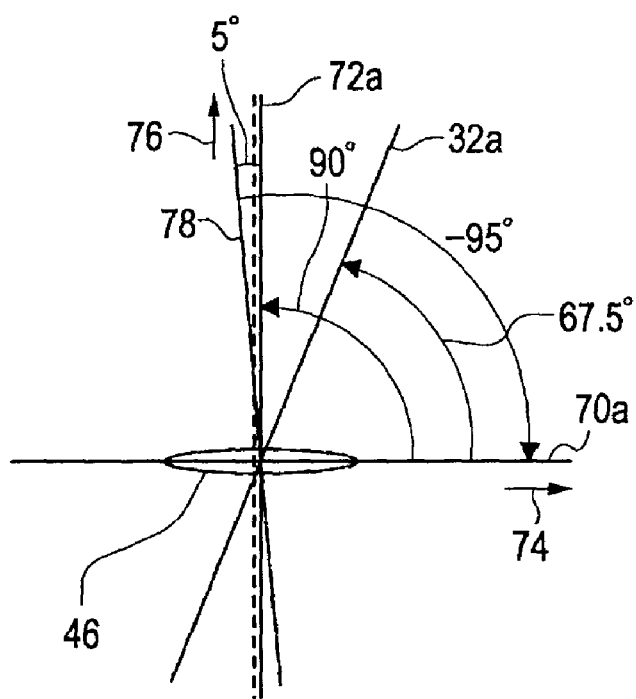

Attention is paid to the transmissive display portion T of the liquid crystal display device 10 according to the present embodiment configured as described above. FIGS. 4A and 4B are views illustrating the arrangement of optical axes of the liquid crystal display device 10 according to the present embodiment. The liquid crystal layer 52 with homogeneous orientation, the first polarizer 70, and the second polarizer 72 are provided. Observing the liquid crystal orientation direction 74 from a normal direction of the substrate is like FIG. 4A. FIG. 4A is a top view of the transmissive display portion T observed from the normal direction on a side of the array substrate 48 after assembling the array substrate 48 and the counter substrate 50. As reference numeral 76 indicates a direction of the data line 18, FIG. 4A is drawn in parallel to FIG. 2. The liquid crystal molecule 46 is subjected to anti-parallel rubbing processing in parallel and anti-parallel to the x axis. A transmission axis 70a of the first polarizer 70 and a transmission axis 72a of the second polarizer 72 are perpendicular to each other and the transmission axis 70a is parallel to the liquid crystal orientation direction 74. Since this is the same configuration as a transmissive IPS (in plane switching) method, a wide viewing angle is also obtained in transmissive display for monitor application, similar to the transmissive IPS method.

Next, noting the reflective display portion R, the liquid crystal layer 52 with homogeneous orientation, the retardation film 32, and the second polarizer 72 are provided. The relationships among a slow axis 32a of the retardation film 32, the liquid crystal orientation direction 74, and the transmission axis 72a of the second polarizer 72 are shown in FIG. 4B. Since the linear portion 26 of the pixel electrode 12 has an inclination of 5° with respect to the scanning line 22a, a main direction 78 of the electric field has an inclination of 5° with respect to the data line 18. When an azimuth is defined counterclockwise, the liquid crystal orientation direction 74 forms an angle of −95° with respect to the electric field direction. Thus, an orientation change when applying a voltage can be stabilized, and an effect of reducing a threshold voltage at which the orientation change occurs is obtained. The slow axis 32a of the retardation film 32 and the transmission axis 72a of the second polarizer 72 form 67.5° and 90° with respect to the liquid crystal orientation direction 74, respectively.

Figure 5A:
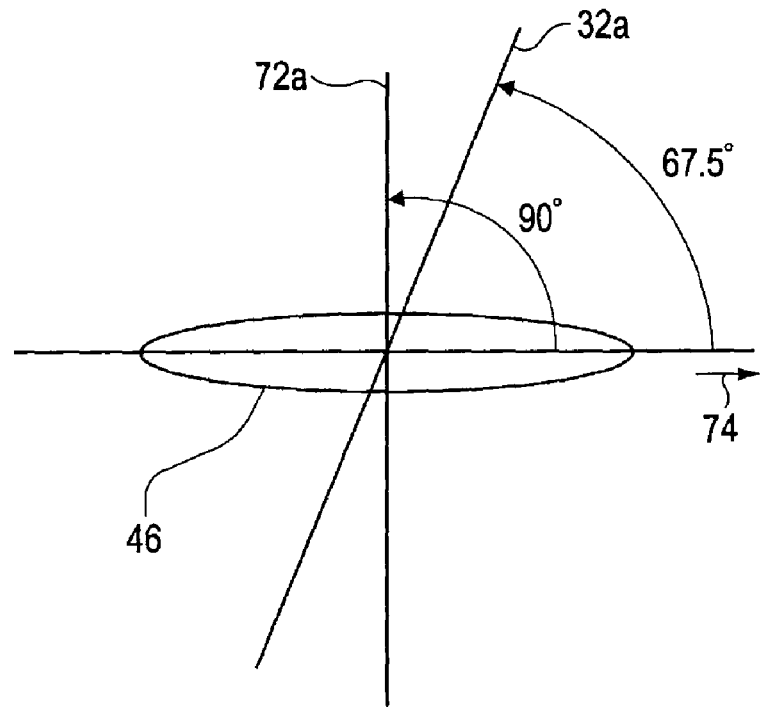
FIGS. 5A and 5B are views illustrating the arrangement of a slow axis of a retardation film and a liquid crystal orientation direction in the liquid crystal display device according to the first embodiment.
Figure 5B:
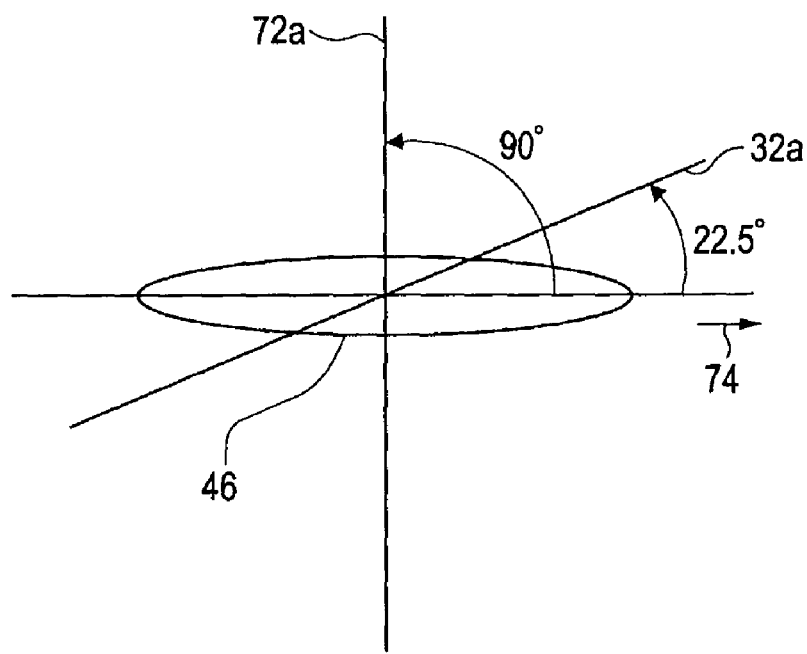

In addition, an angle between the direction of the slow axis 32a of the retardation film 32 in the reflective display portion R and the liquid crystal orientation direction 74 is 65° to 70° or −70° to −65° (refer to FIG. 5A). In other words, the angle between the direction of the slow axis 32a of the retardation film 32 in the reflective display portion R and the liquid crystal orientation direction 74 is 20° to 25° or −25° to −20° (refer to FIG. 5B). Retardations of the liquid crystal layer 52 and the retardation film 32 in the reflective display portion R are set to ¼ wavelength and ½ wavelength, respectively. Accordingly, a laminated body of the liquid crystal layer 52, the retardation film 32, and the second polarizer 72 in the reflective display portion R becomes a wideband circular polarizer. When a voltage is not applied, incident light in the approximately entire visible wavelength range is incident on the first common electrode 28 in a state of circularly polarized light or in a polarized state close to the circularly polarized light. When the light is incident again on the second polarizer 72 after reflection, the light becomes linearly polarized light whose oscillating direction is parallel to an absorption axis of the second polarizer 72. Accordingly, colorless dark display is obtained. Although the liquid crystal orientation direction 74 is not limited to the direction shown in FIGS. 4A and 4B, a direction crossing (direction not matching) the main direction 78 of the electric field occurring between the pixel electrode 12 and the common electrodes 28 and 30 is set as the liquid crystal orientation direction 74. In the present embodiment, the main direction 78 of the electric field forms an angle of 5° with respect to the x axis. In addition, the retardation film 32 is disposed in a direction of setting an angle between the slow axis 32a and the transmission axis 72a of the second polarizer 72 to 67.5°. In this manner, since a required phase difference is given in the reflective display portion R, display with high contrast and wide viewing angle can be realized.

In addition, although the initial orientation direction of liquid crystal molecules in the liquid crystal layer 52 near the horizontal alignment films 64 and 68 is set as a liquid crystal orientation direction for the sake of convenience in FIGS. 4A and 4B, the horizontal alignment films 64 and 68 are not limited to those defining the initial orientation direction of liquid crystal molecules by rubbing processing. For example, alignment films that define the initial orientation direction of liquid crystal molecules by optical orientation or an oblique vapor deposition method may also be used as the horizontal alignment films 64 and 68.

FIG. 6 is a graph illustrating the relationship between a transmittance and positions of electrode width We and electrode distance Ws with respect to a difference between the electrode distance Ws and the electrode width We of the pixel electrode 12 in the liquid crystal display device 10 according to the present embodiment. A line 12at shown in FIG. 6 indicates the relationship between the positions of the electrode width We and electrode distance Ws and the transmittance in the case of 'We>(Ws−1 μm)'. The electrode distance Ws between pixel electrodes 12a is 3 μm and the electrode width We of the pixel electrode 12a is 4 μm. In the case of the line 12at, a transmittance decrease on the electrode width We is large. This leads to an overall transmittance decrease.

A line 12bt indicates the relationship between the positions of the electrode width We and electrode distance Ws and the transmittance in the case of 'We<(Ws−1 μm)'. The electrode distance Ws between pixel electrodes 12b is 5 μm and the electrode width We of the pixel electrode 12b is 2 μm. In the case of the line 12bt, a transmittance decrease on the electrode distance Ws is large. This leads to an overall transmittance decrease.

A line 12ct indicates the relationship between the positions of the electrode width We and electrode distance Ws and the transmittance in the case of 'We=(Ws−1 μm)'. The electrode distance Ws between pixel electrodes 12c is 4 μm and the electrode width We of the pixel electrode 12c is 3 μm. In the case of the line 12ct, a transmittance decrease on the electrode width We and a transmittance decrease on the electrode distance Ws are not large.

That is, as shown by the lines 12at and 12bt, a transmittance at the time of white display in the FFS method is lower than that in the TN method. In particular, this is noticeable in a middle portion of the electrode width We and a middle portion of the electrode distance Ws. However, by setting 'We=(Ws−1 μm)' as shown by the line 12ct, a transmittance decrease on the electrode width We and the electrode distance Ws does not become large.

Figure 7:
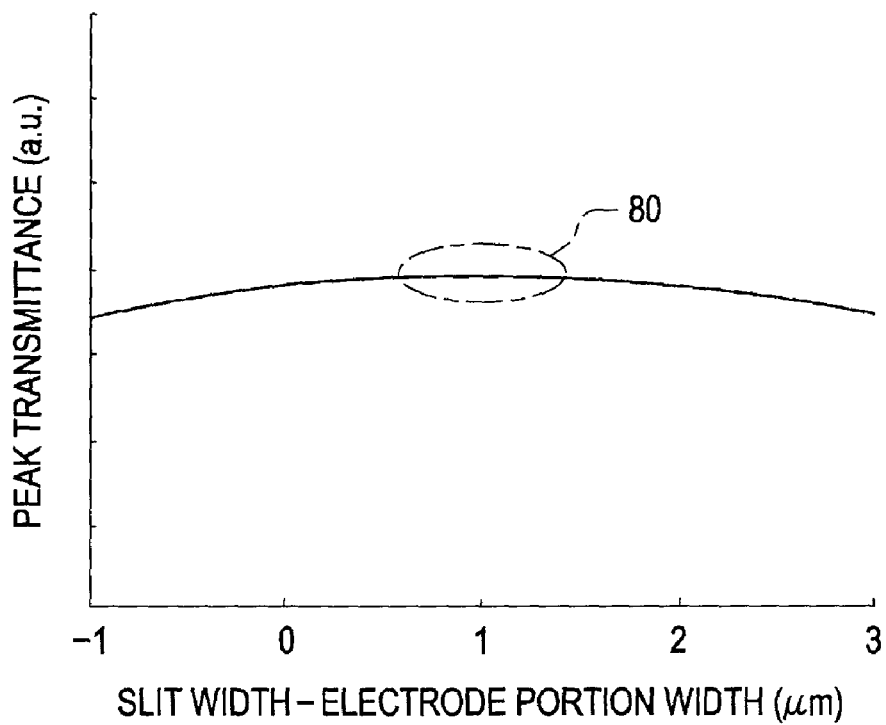
FIG. 7 is a graph illustrating the relationship between a peak transmittance and a difference between an electrode distance and an electrode width of a pixel electrode in the liquid crystal display device according to the present embodiment.

FIG. 7 is a graph illustrating the relationship between a peak transmittance and a difference between the electrode distance Ws and the electrode width We of the pixel electrode 12 in the liquid crystal display device 10 according to the present embodiment. As shown in FIG. 7, the peak transmittance becomes highest when the electrode width We of the pixel electrode 12 is 'Ws−1 μm'. Moreover, in a range 80 of ±0.5 μm from the value, a transmittance of 99.5% or more of the value can be secured. In other words, when the electrode width We of the pixel electrode 12 is in a range of (Ws−1.5 μm) to (Ws−0.5 μm), a transmittance of 99.5% or more of the value can be secured.

Figure 8:
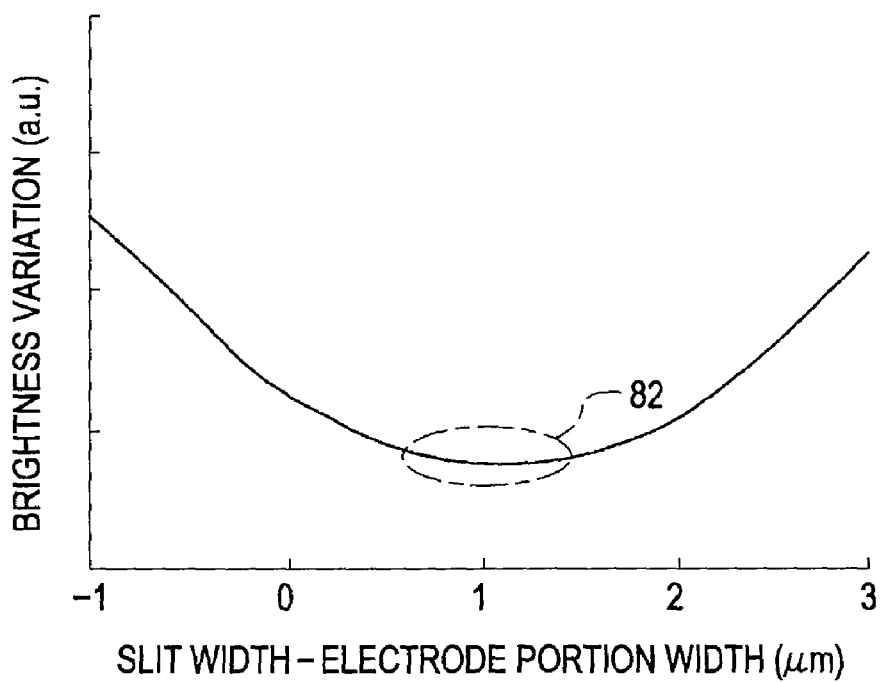
FIG. 8 is a graph illustrating the relationship between a brightness variation and a difference between an electrode distance and an electrode width of a pixel electrode in the liquid crystal display device according to the present embodiment.

FIG. 8 is a graph illustrating the relationship between a brightness variation and a difference between the electrode distance Ws and the electrode width We of the pixel electrode 12 in the liquid crystal display device 10 according to the present embodiment. As shown in FIG. 8, the brightness variation is smallest when the electrode width We of the pixel electrode 12 is 'Ws−1 μm'. Moreover, in a range 82 of ±0.5 μm from the value, a brightness variation of 99.5% or more of the value can be secured. In other words, when the electrode width We of the pixel electrode 12 is in a range of (Ws−1.5 μm) to (Ws−0.5 μm), a brightness variation of 99.5% or more of the value can be secured.

Figure 9:
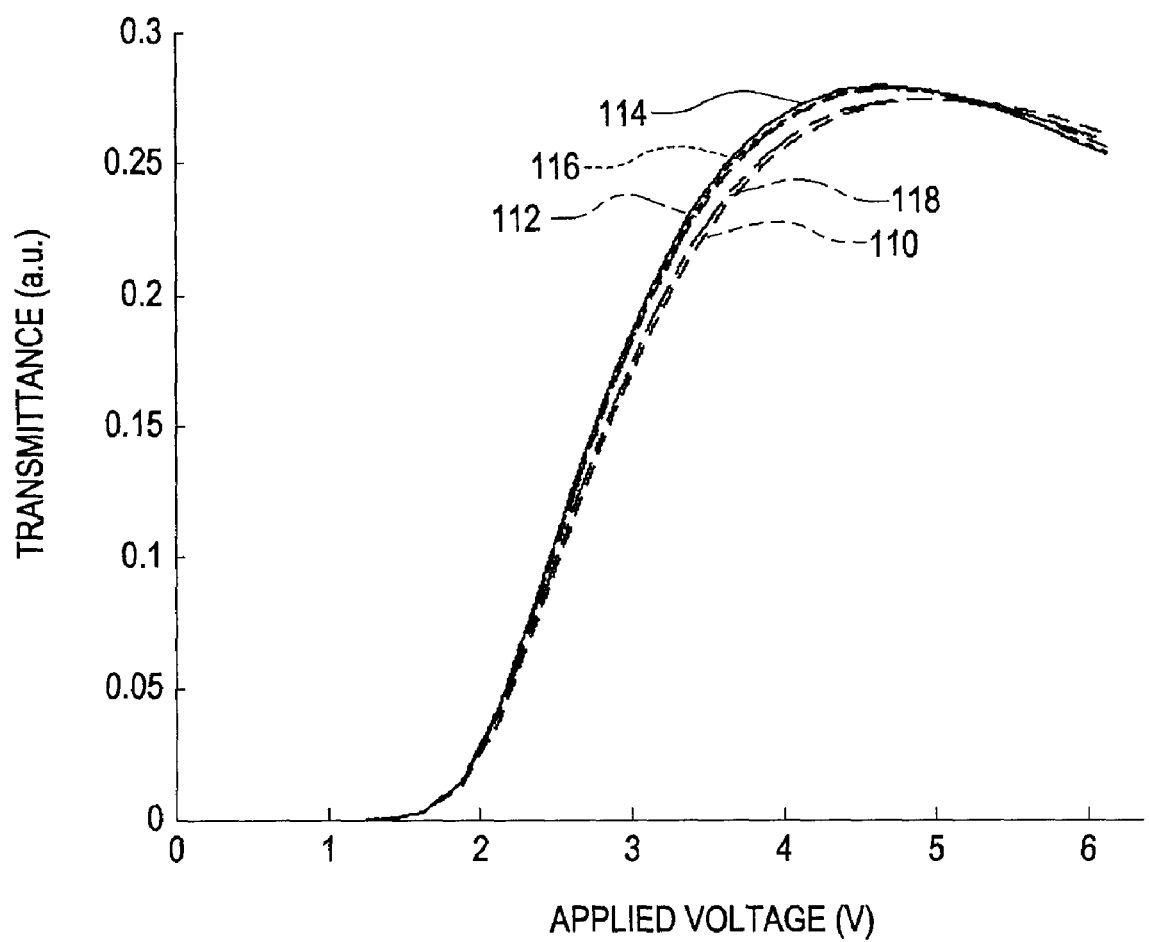
FIG. 9 is a graph illustrating the relationship between a voltage applied between both electrodes and a transmittance of a display region with respect to a difference between an electrode distance and an electrode width of a pixel electrode in the liquid crystal display device according to the present embodiment.

FIG. 9 is a graph illustrating the relationship between a voltage applied between both electrodes and a transmittance of a display region with respect to a difference between the electrode distance Ws and the electrode width We of the pixel electrode 12 in the liquid crystal display device 10 according to the present embodiment. A line 110 shown in FIG. 9 indicates the relationship between a transmittance and an applied voltage when the electrode distance Ws between the pixel electrodes 12 is 3.5 μm and the electrode width We is 4.5 μm. A line 112 indicates the relationship between a transmittance and an applied voltage when the electrode distance Ws between the pixel electrodes 12 is 4 μm and the electrode width We is 4 μm. A line 114 indicates the relationship between a transmittance and an applied voltage when the electrode distance Ws between the pixel electrodes 12 is 4.5 μm and the electrode width We is 3.5 μm. A line 116 indicates the relationship between a transmittance and an applied voltage when the electrode distance Ws between the pixel electrodes 12 is 5 μm and the electrode width We is 3 μm. A line 118 indicates the relationship between a transmittance and an applied voltage when the electrode distance Ws between the pixel electrodes 12 is 5.5 μm and the electrode width We is 2.5 μm. As shown in FIG. 9, the transmittance is highest in the case of the line 114.

Figure 10:
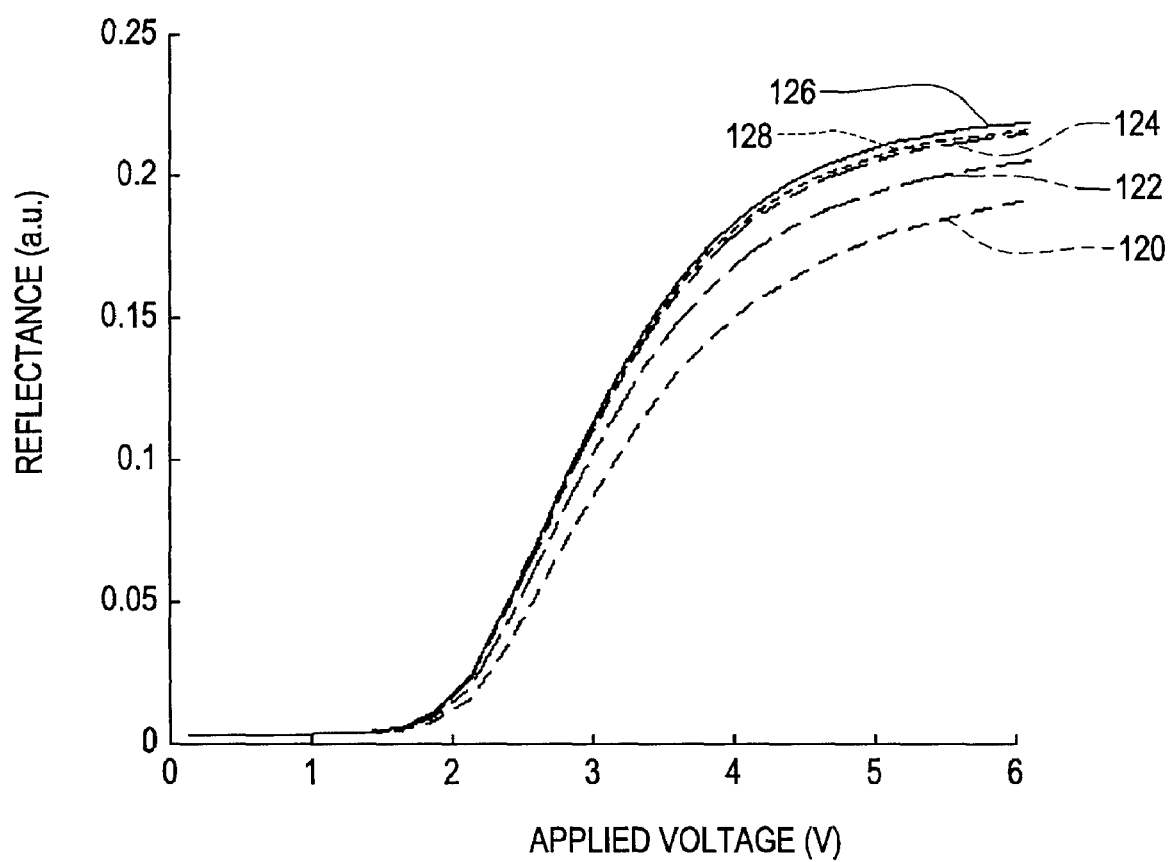
FIG. 10 is a graph illustrating the relationship between a voltage applied between both electrodes and a reflectance of a display region with respect to a difference between an electrode distance and an electrode width of a pixel electrode in the liquid crystal display device according to the present embodiment.

FIG. 10 is a graph illustrating the relationship between a voltage applied between both electrodes and a reflectance of a display region with respect to a difference between the electrode distance Ws and the electrode width We of the pixel electrode 12 in the liquid crystal display device 10 according to the present embodiment. A line 120 shown in FIG. 10 indicates the relationship between a reflectance and an applied voltage when the electrode distance Ws between the pixel electrodes 12 is 2 μm and the electrode width We is 4 μm. A line 122 indicates the relationship between a reflectance and an applied voltage when the electrode distance Ws between the pixel electrodes 12 is 2.5 μm and the electrode width We is 3.5 μm. A line 124 indicates the relationship between a reflectance and an applied voltage when the electrode distance Ws between the pixel electrodes 12 is 3 μm and the electrode width We is 3 μm. A line 126 indicates the relationship between a reflectance and an applied voltage when the electrode distance Ws between the pixel electrodes 12 is 3.5 μm and the electrode width We is 2.5 μm. A line 128 indicates the relationship between a reflectance and an applied voltage when the electrode distance Ws between the pixel electrodes 12 is 4 μm and the electrode width We is 2 μm. As shown in FIG. 10, in the reflective display, the reflectance is highest in the case of the line 126. In other words, FIGS. 9 and 10 show that the transmittance and the reflectance are highest when the electrode width We of the pixel electrode 12 is 'Ws−1 μm'.

According to the present embodiment, by making the electrode width We and the electrode distance Ws in the reflective display portion R smaller than those in the transmissive display portion T and satisfying the relationship in which the electrode width We of the pixel electrode 12 is in a range of (Ws−1.5 μm) to (Ws−0.5 μm) in both the transmissive display portion T and the reflective display portion R, the liquid crystal molecules 46 are sufficiently twisted in both regions of the transmissive display portion T and the reflective display portion R. As a result, brighter transmissive display and reflective display can be obtained. Furthermore, by setting the electrode width We of the pixel electrode 12 to 'Ws−1 μm', brighter transmissive display and reflective display can be obtained. Furthermore, variations in the electrode width We and the electrode distance Ws can be suppressed. Furthermore, a decrease in transmittance at the time of white display can also be suppressed.

Second Embodiment

Next, a second embodiment will be described with reference to the accompanying drawings.

Figure 11:
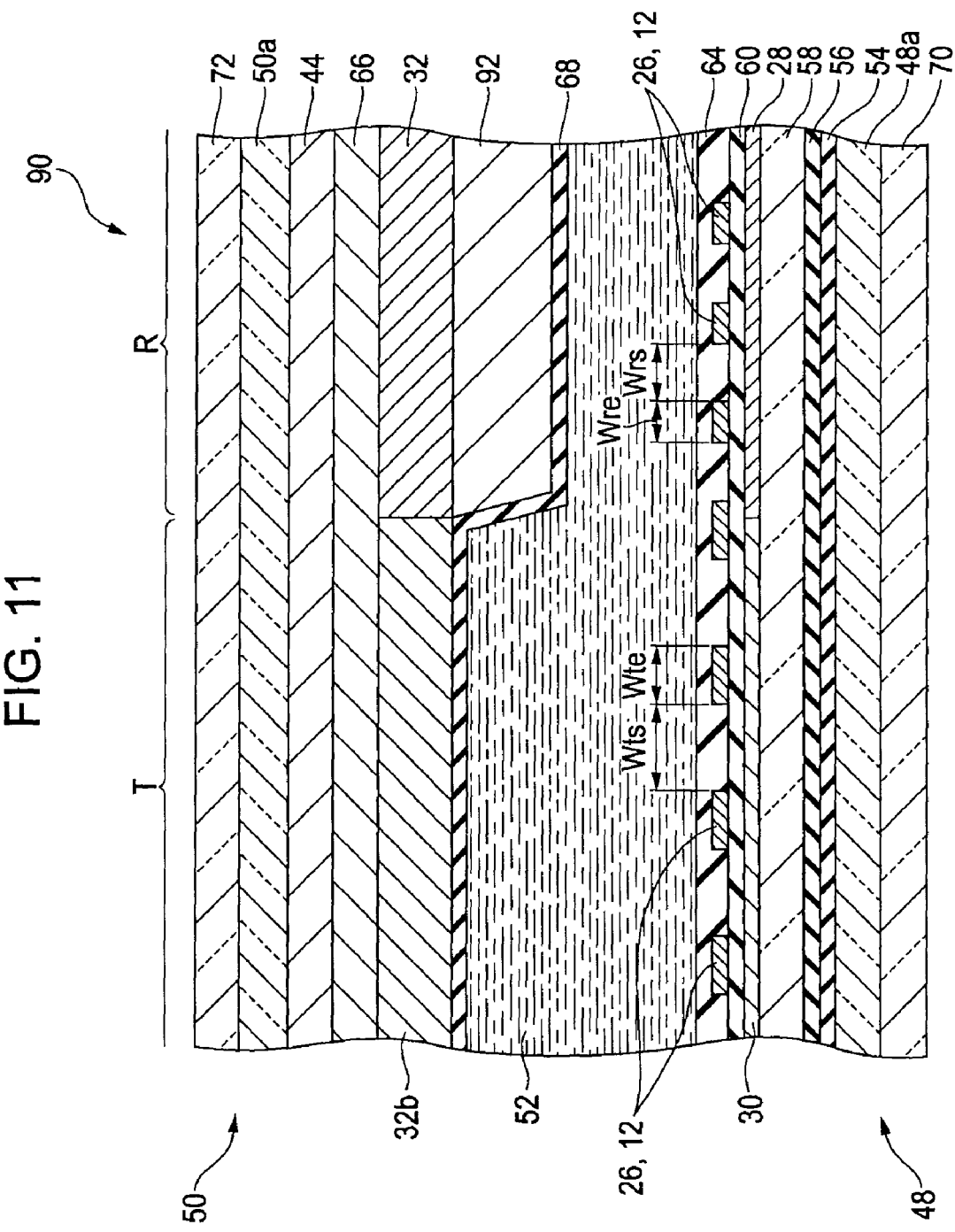
FIG. 11 is a cross-sectional view schematically illustrating a liquid crystal display device according to a second embodiment.

FIG. 11 is a cross-sectional view schematically illustrating a liquid crystal display device 90 according to the present embodiment. FIG. 11 shows the shape of the liquid crystal display device 90 when the liquid crystal display device 90 is cut along a column direction in a certain pixel. Furthermore, similar to the liquid crystal display device 10 according to the first embodiment, the liquid crystal display device 90 according to the present embodiment is a transflective liquid crystal display device which is of a TFT active matrix type. A characteristic point of the liquid crystal display device 90 according to the present embodiment lies in a position at which the retardation film 32 is formed. Accordingly, since the basic configuration of the liquid crystal display device 90 according to the present embodiment is the same as that of the liquid crystal display device 10 according to the first embodiment, common constituent elements are denoted by the same reference numerals and a detailed explanation thereof will be omitted or simplified.

As shown in FIG. 11, the liquid crystal display device 90 according to the present embodiment has a configuration in which a liquid crystal layer 52 is interposed between an array substrate 48 and a counter substrate 50 disposed opposite each other.

The counter substrate 50 has a substrate body 50a as a base. On a side of the substrate body 50a facing the liquid crystal layer 52, a color filter layer 44 and a black matrix layer 42 (refer to FIG. 2) are provided. On a side of the color filter layer 44 and the black matrix layer 42 facing the liquid crystal layer 52, retardation films 32 and 32b are provided in both the reflective display portion R and the transmissive display portion T with a planarizing layer 66 interposed therebetween. In the present embodiment, the retardation films 32 and 32b are so-called inner retardation films that are provided on an inner surface side of the substrate body 50a in order to give a phase difference of about ½ wavelength (λ/2) to light having an oscillating direction parallel to the optical axis direction (slow axis direction). The retardation film 32 has the retardation film 32 provided in the reflective display portion R and the retardation film 32b provided in the transmissive display portion T. The optical axis direction of the retardation film 32 and the optical axis direction of the retardation film 32b are different, and the retardation films 32 and 32b have different optical functions for light incident from a side of the counter substrate 50. In addition, an end of the retardation film 32b not facing the retardation film 32 is disposed to overlap the black matrix layer 42 (refer to FIG. 2) in plan view.

The retardation films 32 and 32b may be formed by applying a solution of polymer liquid crystal molecules or a solution of liquid crystalline monomers on an alignment film and making the polymer liquid crystal molecules or the liquid crystalline monomers oriented in a predetermined direction when drying and solidifying the solution. Specifically, an alignment film (not shown) is formed in the transmissive display portion T and the reflective display portion R and different orientation directions are given to the transmissive display portion T and the reflective display portion R by using a method, such as mask rubbing or optical orientation (orientation division). Then, liquid crystalline monomers that are a polymerizable liquid crystal material are disposed on the alignment film as a material for forming a functional resin layer and the material is polymerized by irradiating ultraviolet rays in an oriented state (liquid crystal phase state). Thus, functional resin layers with different optical properties are formed in the reflective display portion R and the transmissive display portion T, respectively. According to this method, since the orientation direction of liquid crystal molecules in the reflective display portion R is different from that in the transmissive display portion T, the optical axis directions of the retardation films 32 and 32b formed in the reflective display portion R and the transmissive display portion T are also different. Moreover, since the retardation films 32 and 32b are uniformly formed in both the transmissive display portion T and the reflective display portion R, the retardation films 32 and 32b can be easily manufactured compared with a case where the retardation films 32 and the 32b are separately formed. In addition, the phase differences given to transmitted light by the retardation films 32 and 32b may be adjusted according to the type of liquid crystalline monomers, which are constituent materials of the retardation films 32 and 32b, or the thicknesses of the retardation films 32 and 32b.

In a region on the retardation film 32 corresponding to the reflective display portion R, a liquid crystal layer thickness adjusting layer 92 for making the thickness of the liquid crystal layer 52 in the reflective display portion R smaller than the thickness of the liquid crystal layer 52 in the transmissive display portion T is selectively provided. In the transflective liquid crystal display device 90, incident light on the reflective display portion R is transmitted through the liquid crystal layer 52 twice but incident light on the transmissive display portion T is transmitted through the liquid crystal layer 52 only once. Accordingly, since retardation of the liquid crystal layer 52 changes between the reflective display portion R and the transmissive display portion T, a difference in the optical transmittance occurs and uniform image display is not obtained. For this reason, by providing the liquid crystal layer thickness adjusting layer 92, a multi-gap structure is realized. Specifically, the thickness of the liquid crystal layer 52 in the reflective display portion R is set to about a half of that of the liquid crystal layer 52 in the transmissive display portion T, such that the retardation of the liquid crystal layer 52 in the reflective display portion R is set to be approximately equal to that of the liquid crystal layer 52 in the transmissive display portion T. As a result, uniform image display can be obtained in the reflective display portion R and the transmissive display portion T.

A horizontal alignment film 68 formed of a polyimide, a silicon oxide, or the like is provided to cover the liquid crystal layer thickness adjusting layer 92 and the retardation film 32b.

Electronic Apparatus

Figure 12:
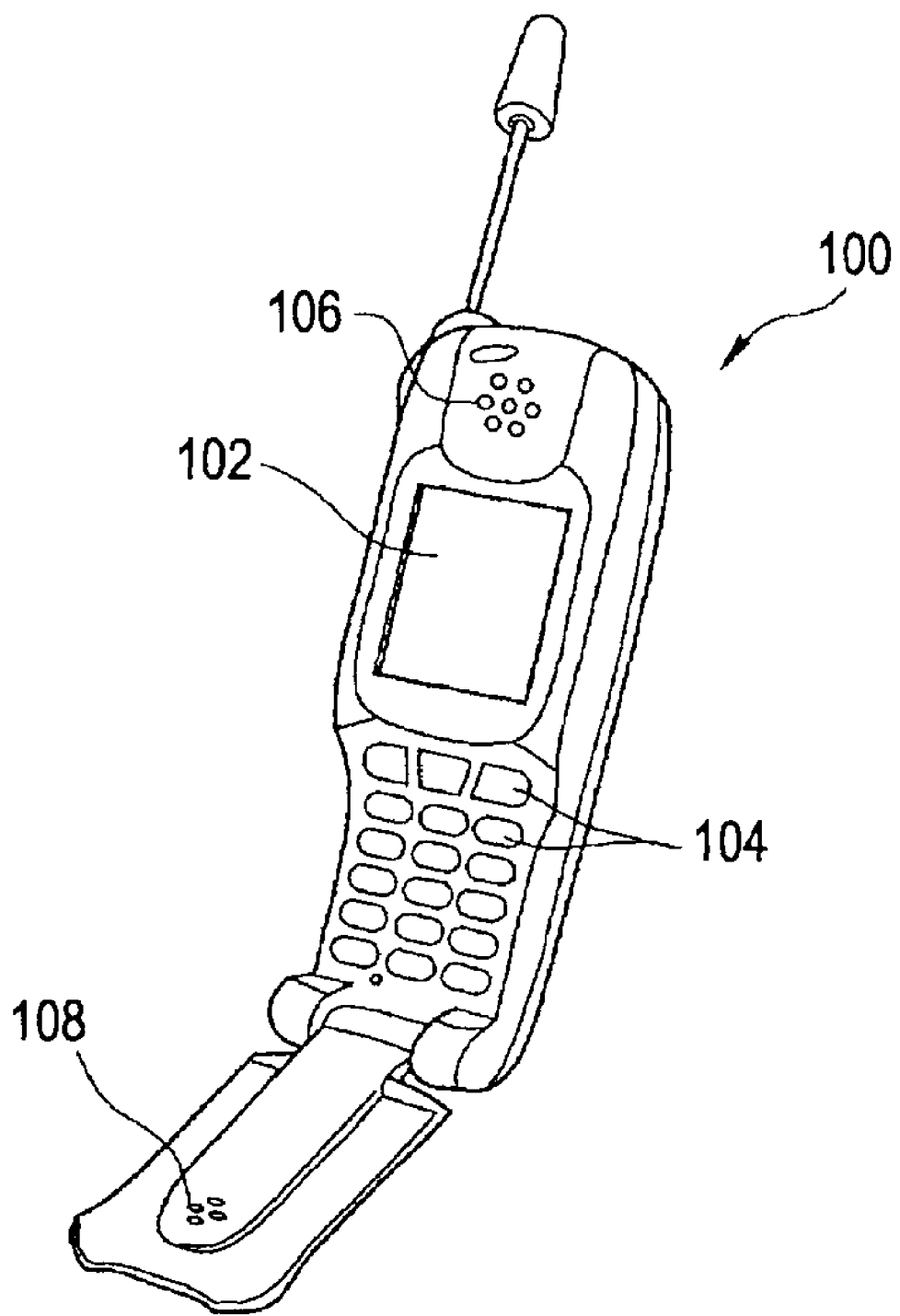
FIG. 12 is a perspective view illustrating an example of an electronic apparatus according to the present embodiment.

FIG. 12 is a perspective view illustrating an example of an electronic apparatus according to the present embodiment. A mobile phone 100 shown in FIG. 12 includes the liquid crystal display device according to each of the above-described embodiments as a small display unit 102. In addition, the mobile phone 100 is configured to include a plurality of operation buttons 104, an earpiece 106, and a mouthpiece 108. The liquid crystal display devices according to the embodiments may also be suitably used as image display units of an electronic book, a personal computer, a digital still camera, a liquid crystal television, a view finder type or monitor direct view type video tape recorder, a car navigation system, a pager, an electronic diary, an electronic calculator, a word processor, a workstation, a video phone, a POS terminal, an apparatus having a touch panel, and the like without being limited to the mobile phone. In this case, in any of the electronic apparatuses, transmissive display and reflective display become possible with high brightness, high contrast, and a wide viewing angle.

While the embodiments have been described with reference to the accompanying drawings, it is needless to say that the invention is not limited to the embodiments.

For example, although the electrode distance between the linear portions 26 of the pixel electrode 12 is set as a slit configuration, the electrode configuration is not limited thereto but the pixel electrode 12 may be configured to include a comb-like electrode.

Furthermore, although the common electrodes 28 and 30 are approximately solid electrodes in plan view and the pixel electrode 12 is configured to include the plurality of linear portions 26 in the above-described embodiment, the configurations of the electrodes are not limited thereto but each of the pixel electrode 12 and the common electrodes 28 and 30 may be configured to include a plurality of strip-shaped electrodes. That is, it may be possible to adopt an electric field generating (transverse electric field) method in which the pixel electrode 12 and the common electrodes 28 and 30 are configured to face each other in a state of being adjacent to each other in the same layer in plan view. For example, it may be possible to adopt an electrode structure in which both a common electrode and a pixel electrode are approximately comb-like electrodes in plan view and strip-shaped electrodes, which form comb portions thereof, are disposed to engage with each other. Thus, the same operations and effects as in the above-described embodiments can be acquired even if the configuration of electrodes is changed.

Moreover, in the present embodiment, a substrate on a side on which light from the backlight is incident is used as the array substrate 48, a substrate (substrate facing a substrate provided with the first common electrode 28) on a side on which reflected light is incident is used as the counter substrate 50, the first common electrode 28 is disposed on a side of the array substrate 48, and a retardation film is disposed on a side of the counter substrate 50. However, the same characteristics are obtained even if the substrate on the side on which light from the backlight is incident is used as the counter substrate 50, the substrate on the side on which reflected light is incident is used as the array substrate 48, the first common electrode 28 is disposed on the side of the counter substrate 50, and the retardation film is disposed on the side of the array substrate 48.

In addition, although a configuration where the pixel electrode 12 is used as an upper electrode and the common electrodes 28 and 30 are used as lower electrodes is adopted in the above-described embodiments, the configuration of electrodes is not limited to thereto. Even if the pixel electrode 12 is used as a lower electrode and the common electrodes 28 and 30 are used as upper electrodes, the same characteristics can be obtained.

The entire disclosure of Japanese Patent Application No. 2008-079956, filed Mar. 26, 2008 is expressly incorporated by reference herein.

What is claimed is:

1. A liquid crystal display device comprising:

a liquid crystal layer interposed between first and second substrates;

a first electrode provided on a side of the first substrate facing the liquid crystal layer; and a second electrode having a plurality of linear portions, an electric field being generated between the first and second electrodes, wherein a reflective display portion and a transmissive display portion provided with the first and second electrodes are included in one pixel, the thickness of the liquid crystal layer in the reflective display portion is set smaller than that of the liquid crystal layer in the transmissive display portion, first and second polarizers having transmission axes approximately perpendicular to each other are provided on outer sides of the first and second substrates, respectively, the transmission axis of one of the first and second polarizers is set approximately in parallel to a liquid crystal orientation direction of the liquid crystal layer, the plurality of linear portions of the second electrode are arrayed to have predetermined electrode widths and a predetermined electrode distance therebetween, an electrode distance Wrs of the plurality of linear portions in the reflective display portion is set smaller than an electrode distance Wts of the plurality of linear portions in the transmissive display portion, an electrode width Wre of each of the plurality of linear portions in the reflective display portion is set smaller than an electrode width Wte of each of the plurality of linear portions in the transmissive display portion, and the relationship of $(Wrs-1.5\ \mu m) \leq Wre \leq (Wrs-0.5\ \mu m)$ is satisfied in the reflective display portion and the relationship of $(Wts-1.5\ \mu m) \leq Wte \leq (Wts-0.5\ \mu m)$ is satisfied in the transmissive display portion.

2. The liquid crystal display device according to claim 1, wherein the relationship of $(Wrs-1.0\ \mu m)=Wre$ and $(Wts-1.0\ \mu m)=Wte$ is further satisfied.

3. The liquid crystal display device according to claim 1, further comprising:
- a reflector provided in the reflective display portion on the side of the first substrate facing the liquid crystal layer; and
- a retardation film that faces the reflector and is provided on a side of the second substrate facing the liquid crystal layer.

4. The liquid crystal display device according to claim 1, further comprising:
- a reflector provided in the reflective display portion on the side of the first substrate facing the liquid crystal layer; and
- a retardation film that is provided on a side of the second substrate facing the liquid crystal layer so as to cover the pixel and that has different slow axis directions in the reflective display portion and the transmissive display portion, a slow axis in the transmissive display portion being perpendicular or parallel to the transmission axis of the first polarizer.

5. The liquid crystal display device according to claim 3, wherein retardation of the liquid crystal layer in the reflective display portion is a ¼ wavelength, and retardation of the retardation film is a ½ wavelength.

6. The liquid crystal display device according to claim 1, wherein the liquid crystal layer has homogeneous orientation, and
an angle between a slow axis direction of the retardation film in the reflective display portion and the liquid crystal orientation direction is 65° to 70° or −70° to −65°.

7. The liquid crystal display device according to claim 1, wherein the liquid crystal layer has homogeneous orientation, and
an angle between a slow axis direction of the retardation film in the reflective display portion and the liquid crystal orientation direction is 20° to 25° or −25° to −20°.

8. An electronic apparatus comprising the liquid crystal display device according to claim 1.

* * * * *